(12) United States Patent
Pokorny

(10) Patent No.: US 6,680,012 B2
(45) Date of Patent: Jan. 20, 2004

(54) INJECTION MOULDING METHOD

(75) Inventor: Peter Pokorny, Schwertberg (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 153 days.

(21) Appl. No.: 10/093,272

(22) Filed: Mar. 7, 2002

(65) Prior Publication Data
US 2003/0168778 A1 Sep. 11, 2003

(51) Int. Cl.[7] .......................... B29C 45/53; B29C 45/76
(52) U.S. Cl. ..................... 264/40.4; 264/51; 264/328.1
(58) Field of Search ...................... 425/4, 145, 149, 425/146, 147; 264/51, 53, 52, 55, 328.1, 328.19, 40.1, 40.4, 40.5

(56) References Cited

U.S. PATENT DOCUMENTS

| | | | | |
|---|---|---|---|---|
| 3,052,925 A | * | 9/1962 | Bronnenkant et al. | 264/328.17 |
| 3,179,134 A | * | 4/1965 | Sigrist | 264/51 |
| 4,266,928 A | * | 5/1981 | Weidner et al. | 264/51 |
| 4,952,364 A | * | 8/1990 | Matsuda et al. | 264/40.1 |
| 5,194,195 A | * | 3/1993 | Okushima | 264/40.1 |
| 6,322,347 B1 | * | 11/2001 | Xu | 264/53 |
| 6,547,996 B1 | * | 4/2003 | Kamiyama et al. | 264/51 |

* cited by examiner

Primary Examiner—Jill L. Heitbrink
(74) Attorney, Agent, or Firm—Notaro & Michalos P.C.

(57) ABSTRACT

Injection moulding method in which plastic material contained under pressure in an antechamber is injected into a mould cavity and fills said mould cavity under pressure, by expansion of the plastic material. After closing of the entrance to the antechamber the position of the piston and the pressure in the antechamber are monitored, and the final position of the piston is determined by a calculation which takes account of at least one value of the measured pressure and of the position of the piston at which said pressure was measured.

5 Claims, 2 Drawing Sheets

INJECTION MOULDING METHOD

Figure 1:
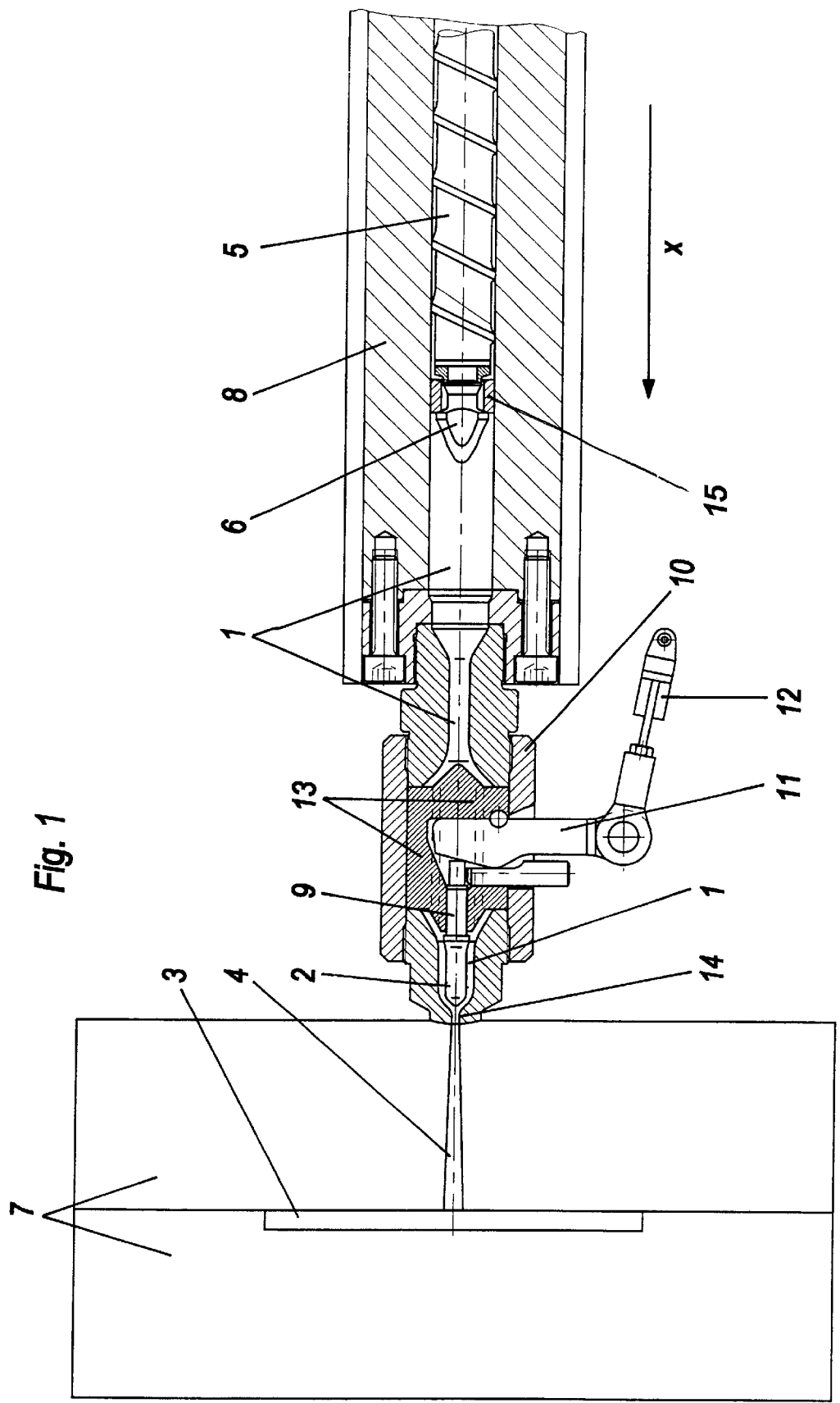

The invention relates to an injection-moulding method in which plastic material under pressure is injected from an antechamber which can be shut off by a shut-off means, into a mould cavity after opening of said shut-off means, and fills the mould cavity under pressure.

U.S. Pat. No. 2,952,041 discloses a method in which the pressure in the antechamber is due to the continuous rotation of an extrusion screw which continuously supplies molten plastic to the antechamber. The maximum pressure that can be achieved in this way is approximately 10.000 p.s.i. The expansion of the molten plastic material taking place after the opening of an orifice of the antechamber would per se not entirely fill the mould cavity. Rather, the filling is caused in part by the continuous addition of new material to the antechamber. The method disclosed in U.S. Pat. No. 2,052,041 eliminates the need for a ram extruder in injection moulding.

Unlike U.S. Pat. No. 2,052,041 the invention is less concerned with a rapid sequence of injection events but rather it is an object of the invention to decrease the time for the individual filling of the mould cavity.

Particularly in the production of small and thin-walled components it is essential for the injection operation to be terminated rapidly as otherwise partial hardening of the plastic material already occurs in the cooled mould during the injection procedure. In order to achieve high injection speeds, hitherto the advance speed of the screw or a separate injection piston which is possibly provided has been increased more and more. The invention is based on the thought that further development along those lines is not meaningful as, at high piston advance speeds, the molten material in the antechamber is primarily compacted, whereas that achieves little in terms of filling the mould cavity.

Therefore an object of the invention is to rapidly fill the mould cavity, particularly when injection-moulding thin and small mouldings, whereby the speed of the injection piston is to play no part or only a subordinate part.

In a previous application (cf. WO 01/03906) applicants have achieved this object on principle by compressing the molten material in the antechamber by means of a piston whereby the pressure obtained is sufficient to ensure that the subsequent expansion of the material enclosed in the antechamber is sufficient to fill the mould cavity.

Insofar as hitherto a pressure which is comparable to the pressure in the mould interior had been built up upstream of the shut-off means, prior to opening of the shut-off means, the only result of that pressure was that the mould was initially partially filled by expansion of the plastic material in the antechamber until after some delay the action of the screw advance movement came into effect. In contrast, WO 01/03906 is based on the notion that the entire mould cavity is filled merely by expansion of the supply of plastic material which has accumulated in the antechamber and which is under high pressure. If additionally a movement of the screw or other injection piston takes place intentionally or unintentionally, that only results in a modification of the adiabatic expansion method which in itself governs the filling of the mould. In practical terms that means that the pressure in the antechamber, which conventionally does not exceed 800 bars, is typically increased to over 1500 bars when carrying the invention into effect, and in particular that the volume of the antechamber is not reduced to a very substantial extent, as is usual, during the injection operation, but is entirely or predominantly maintained.

Practical experience with the ideas forwarded in WO 01/03906 showed that the weight of the articles produced under seemingly identical conditions and, therefore, the quality of the articles showed unexpected fluctuations. A possible explanation was sought in variations of the flow characteristics of the melt or in a deterioration of the shut-off valve. Finally, an essential cause for the less than perfect function of the known device was identified: there may be a difference between the volume of the antechamber at the beginning of the axial movement of the piston and the volume of the molten plastic encluded in the antechamber. This is due to the fact that the back-flow closure means provided at the tip of the plastifier is activated only by the axial movement of the screw. The moment at which the screw starts to act as a piston rather than a plastifier is, therefore, not well-defined. Therefore, the mass of material compressed by the piston varies between different injection cycles. This is the starting point for the invention which provides that the position of the piston and the pressure in the antechamber are monitored after the start of the axial movement of the piston and that the position of the piston, at which the closure means between antechamber and mould cavity is opened, is calculated taking into account at least one value of the measured pressure and of the position of the piston at which the measurement was performed.

The invention is based on the idea that starting with different masses of plastic material enclosed in the antechamber articles with identical weight and quality can be obtained if a pressure is chosen in the antechamber which compensates for the difference in mass. In detail this will be explained in connection with the drawings.

Figure 2:
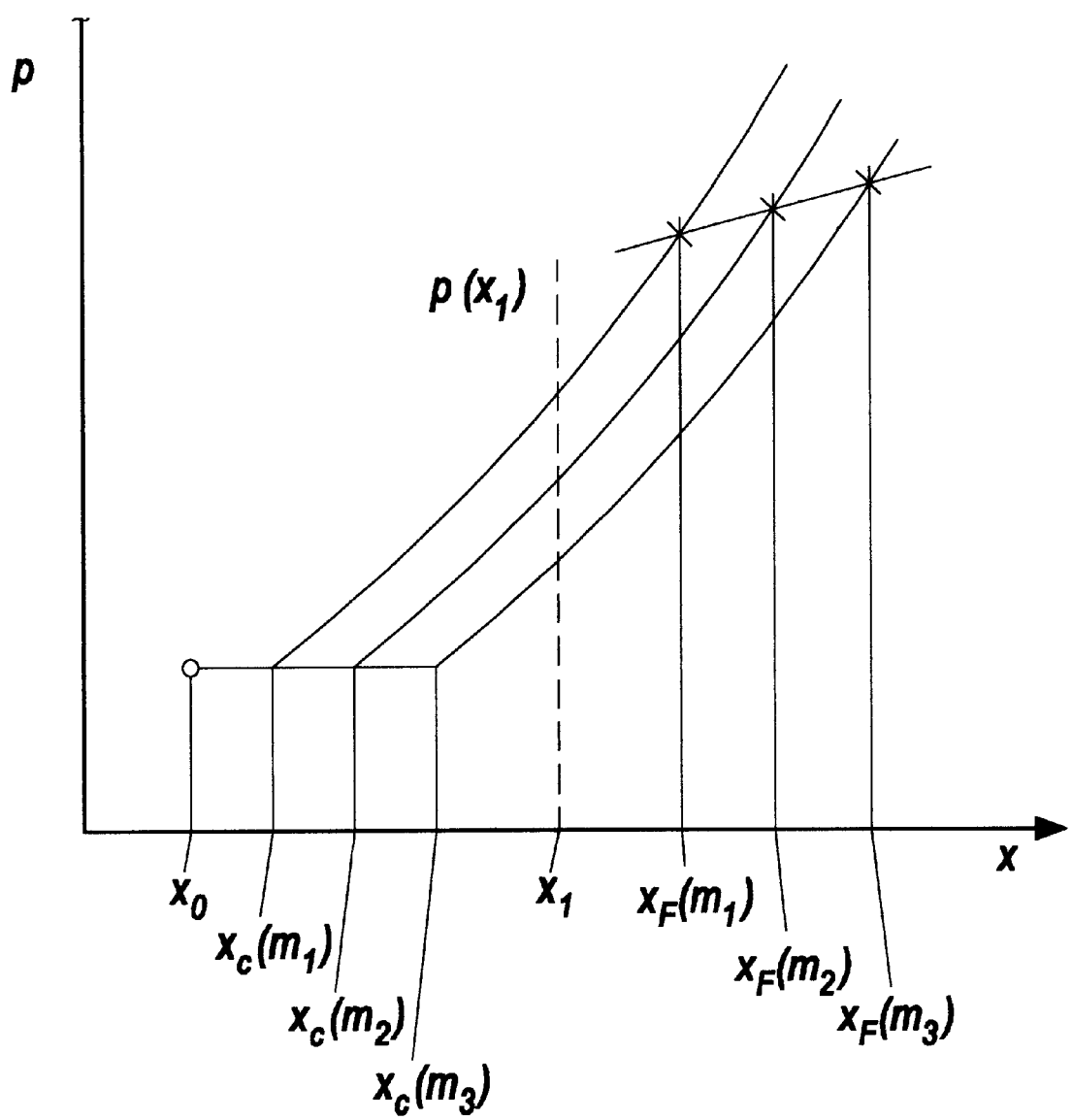

FIG. 1 serves to explain the known method underlying the invention as disclosed in WO 01/03906, and FIG. 2 is a diagram explaining the invention.

The process according to the invention can be carried into effect on any conventional injection-molding apparatus insofar as the feed flow to the mould cavity is controllable by a shut-off means. Therefore, only the parts of an injection-moulding apparatus which are essential to the process of the invention are described and illustrated here.

In the illustrated apparatus thermoplastic material is plasticised in the cylinder 8 by a screw 5 and passes into the antechamber 1. The antechamber extends through the bores 13 almost to the mould 7. Its front opening 14 (exit) is closable towards the mould 7 by means of closure means 2, whereas a back-flow of the plastic material out of the antechamber 1 is prevented by a back-flow closure means 6 at the tip of the screw 5.

An essential functional part of the closure means 2 is a closure needle 9 which, under the pressure of the plastic material in the antechamber 1, has a tendency to move towards the right in the drawing. The needle 9 is acted upon in the closure direction by a lever 11 which is pivotable about the pin 10 and which is subjected to the action of a controllable hydraulic unit 12.

It is essential for the invention that a high pressure is built up in the plastic material disposed in front of the closure means 2 and that filling of the mould cavity 3 and the gate region 4 in front thereof is effected by expansion of the plastic material in the antechamber 1. Opening of the closure means 2 can be effected in a controlled manner in order to modify the pressure in the mould cavity 3 which is, however, determined primarily by the adiabatic relief of pressure of the plastic material in the antechamber 1.

In order to be able to suitably determine pressure and volume in the antechamber 1 for a given mould cavity 3, desirably firstly a volume which substantially exceeds the volume of the mould cavity 3 is selected for the antechamber 1. Then the desired pressure in the mould cavity 3 is selected. The pressure in the antechamber 1 which leads to that result can be ascertained in a simple series of tests. With knowledge of the state equation of the plastic material used, it is also readily possible to calculate that pressure. This will be subsequently demonstrated by means of an embodiment.

EXAMPLE

Material used: Polystyrene 143 E

Density at ambient temperature: 1.047 g/cm$^3$

Volume of the antechamber 1 in front of the closure means 2: 45.6 cm$^3$

Volume behind the shut-off means 2: 1.37 cm$^3$, of which 1 cm$^3$ actual mould cavity 3

The plastic material is under a pressure of 2000 bars, and its temperature is around 30° above the desired operating temperature of 220° C. This pressure is far above the value achieved as back pressure by the rotation of the screw. It is mainly due to a forward motion of the screw—now acting as a piston—after closing of the entrance to antechamber 1. This entrance is located in the back-flow closure means 6, controlled by the position of a ring 15.

The closure means 2 is now opened, whereby the plastic material expands to the entire available volume, that is to say into the region 4 of the gate and into the mould cavity 3. Due to that adiabatic expansion, cooling by 30° C. takes place and there is a pressure drop to the desired final range of 500 bars.

Previously it was assumed that a given value of pressure and temperature at the beginning of the forward movement of the screw results in a well-defined pressure at any forward position of the screw which now acts as a piston. As is shown in FIG. 2 in an exaggerated scale the closing of the back-flow closure means 6 (which closing transforms the plasticising screw into a piston) is not caused immediately at screw position $x_O$, at which the forward movement begins. The closing of the back flow shutoff means 6 is delayed and depending on that delay different masses $m_1$, $m_2$, . . . are enclosed in the antechamber. For each mass pressure is a unique function of the screw position x. For each mass there exists also a pair of values of pressure p and final position $x_F$ of the screw (this position defining the volume of the antechamber) at which the closure means 2 should be opened in order to obtain the desired weight of the produced article. This value is found experimentally and indicated by an asterisk in the diagram. It is clear that the smaller mass $m_3$ has to be compressed to a higher pressure than the greater mass $m_1$ if the expansion of those masses should yield the same result.

In order to determine $x_F$ it is necessary to know the mass m enclosed in the antechamber. The closing process of the shut-off means 6 cannot be directly observed, however, and therefore $x_O$ is not known. According to the invention, the pressure p in the antechamber is, therefore, measured as a function of the position x of the piston and therefrom m is deduced. Preferably, the measuring is done continuously. Theoretically, a single value $p(x_1)$ is sufficient to find out which of the curves in FIG. 2 relates to the actual situation and what value of $x_F$ has therefore to be chosen to reach the final pressure marked with an asterisk.

The final value $x_F$ can be represented as sum of an average value known from experience and of a correction made during each cycle after measuring p(x). This makes sure that even if the measurement or the calculation has no clear result, there exists a reasonable value for $x_F$ at which the screw 5 is brought to stop and the closure means 2 is opened.

p(x) may be measured with a sensoring device which is located in the antechamber 1. It is also possible, however, to measure the force which is exerted by the screw 5 on its bearings under the influence of the pressure exerted by the plastic material in the antechamber. Measuring the longitudinal position x of the screw 5 is straightforward. If an electric servo motor is used to effect the longitudinal movement of screw 5, the longitudinal position x is unambiguously related to the control signals for the motor.

It is not necessary to open the closure means 2 exactly at the moment when the piston comes to a stop at the position $x_F$. It is even advantageous to delay the opening of the closure means 2 for one or two seconds during which time the material in the antechamber 1 is homogenised.

What is claimed is:

1. Injection moulding method in which plastic material contained under pressure in an antechamber is injected into a mould cavity and fills said mould cavity under pressure, the antechamber having an entrance and an exit both with closure means, the volume of the antechamber being reduced after the closing of the entrance by axial movement of a piston into a final position to such a degree that the pressure in the reduced volume of the antechamber causes the filling of the mould cavity by expansion of the plastic material after the opening of the closure means of said exit, characterised in that after closing of the entrance to the antechamber the position of the piston and the pressure in the antechamber are monitored, and the final position of the piston is determined by a calculation which takes account of at least one value of the measured pressure and of the position of the piston at which said pressure was measured.

2. A method according to claim 1, characterised in that the pressure in the antechamber at the opening of the exit closure means is over 1000 bars and preferably over 1500 bars.

3. A method according to claim 2 characterised in that the volume of the antechamber at the opening of the shut-off means is at least twice as great as the volume which is downstream of the shut-off means and which includes the mould cavity.

4. A method according to claim 1, characterised in that the volume of the antechamber is further changed after the opening of the exit closure means to such a degree that this causes a change of less than 50% in the pressure in the mould cavity which is obtained without such reduction.

5. A method according to claim 1, characterised in that the volume of the antechamber is kept constant during the injection operation so that the total pressure in the mould cavity is produced by expansion of the plastic material which initially fills only the antechamber.

* * * * *